United States Patent

Nagaoka et al.

Patent Number: 5,686,539
Date of Patent: *Nov. 11, 1997

[54] THERMOPLASTIC COMPOSITIONS

[75] Inventors: Kenji Nagaoka; Satoru Gotoh, both of Ichihara, Japan

[73] Assignee: Sumitomo Chemical Company, Limited, Osaka, Japan

[*] Notice: The portion of the term of this patent subsequent to Nov. 15, 2011, has been disclaimed.

[21] Appl. No.: 793,002

[22] Filed: Nov. 15, 1991

[51] Int. Cl.$^6$ .............. C08F 283/08; C08L 81/04
[52] U.S. Cl. .............. 525/395; 525/537
[58] Field of Search .............. 525/395, 537

[56] References Cited

U.S. PATENT DOCUMENTS

| | | | |
|---|---|---|---|
| 5,026,764 | 6/1991 | Okabe et al. | 525/537 |
| 5,028,656 | 7/1991 | Okabe et al. | 525/537 |

FOREIGN PATENT DOCUMENTS 2218996  11/1989  United Kingdom.

*Primary Examiner*—Helen Lee
*Attorney, Agent, or Firm*—Watson Cole Stevens Davis P.L.L.C.

[57] ABSTRACT

The present invention relates to a resin composition comprising (A) polyphenylene ether, (B) polyarylene sulfide and (C) polyisocyanate, wherein the polyisocyanate is an organic compounds having the general formula:

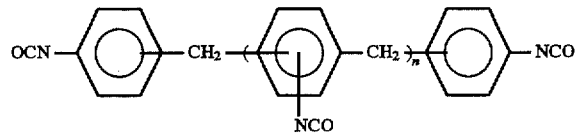

wherein n is an integer of 1 or more.

4 Claims, No Drawings

THERMOPLASTIC COMPOSITIONS

BACKGROUND OF THE INVENTION

1. Field of the Invention

The present invention relates to resin compositions, and more specifically to thermoplastic resin compositions having high impact strength, and comprising polyphenylene ether resins and polyarylene sulfide as main resin components.

2. Description of the Prior Arts

Polyphenylene ethers are resins having good mechanical and electrical properties and also having high thermal resistance. However, polyphenylene ethers are rather poor in moldability and solvent resistance, so that the use of polyphenylene ethers alone is greatly limited.

On the other hand, polyarylene sulfides, including polyphenylene sulfides, are an example of thermal resistant resins and have such characteristic properties that they can continuously be used at high temperatures, and that, they have high rigidity. In addition, they have high melt flowability, satisfactory flame resistance and high solvent resistance. Therefore, polyarylene sulfides are widely used for the production of molded articles and films. However, polyarylene sulfide have such a drawback that they are poor in mechanical strength and particularly impact strength, so that it is difficult, due to this drawback, to further extend the field where polyarylene sulfides can be used.

As explained above, polyphenylene ethers and polyarylene sulfides individually have certain good properties. It is therefore industrially advantageous to provide a resin composition comprising a mixture of polyphenylene ethers and polyarylene sulfides and having all of the good properties of these two individual resins. An example of such resin compositions are known from the disclosure of Japanese Patent Application KOKOKU No. 56-34032. However, in general, polyphenylene ethers have low compatibility with polyarylene sulfides, and therefore it is rather difficult to produce resin compositions having good mechanical properties, by blending polyphenylene ethers with polyarylene sulfides.

There are certain known compositions provided for the purpose of improving the above-mentioned disadvantages. For instance, Japanese Patent Application KOKOKU No. 60-11063 discloses resin compositions comprising polyphenylene ethers, polyphenylene sulfides and epoxy resins. Japanese Patent Application KOKAI No. 64-36645 discloses resin compositions comprising modified polyphenylene ethers and polyphenylene sulfides. Japanese Patent Application KOKAI No. 1-266160 teaches resin compositions comprising modified polyphenylene ethers, modified polyphenylene sulfides and a binder. Japanese Patent Application KOKAI No. 2-49023 discloses resin compositions comprising unsaturated carboxylic acid-modified or unsaturated carboxylic acid anhydride-modified polyphenylene ethers, polyphenylene sulfides and polyisocyanates, and also teaches other resin compositions comprising polyphenylene ethers, polyphenylene sulfides, polyisocyanates and a modifier selected from the group consisting of unsaturated carboxylic acids and unsaturated carboxylic acid anhydrides. It is recognized that the resin compositions, disclosed in Japanese Patent Application KOKAI No. 2-49023, are good, for instance, in solvent resistance, moldability and mechanical properties.

However, it should be noted that the resin compositions, disclosed in Japanese Patent Application KOKAI No. 2-49023, are still unsatisfactory in impact strength. So, it is highly desirable to provide resin compositions with high impact strength. The above-mentioned application states that certain resin compositions, comprising polyphenylene ethers, polyphenylene sulfides and polyisocyanates, are low in mutual compatibility of the resin components contained therein, and poor in solvent resistance.

It is an object of the present invention to provide resin compositions, which comprise polyphenylene ethers inherently having good thermal resistance and mechanical properties, and polyarylene sulfides inherently having good solvent resistance, flame retardant properties and melt flowability as main resin components, so that the resin compositions are satisfactorily good in solvent resistance, impact strength and furthermore are economical.

In order to attain this object, the present inventors have made many studies on resin compositions mainly comprising polyphenylene ethers, polyarylene sulfides and polyisocyanates, and have found that it is possible to produce satisfactory resin compositions having good mutual compatibility of the resin components contained therein and also having high impact strength, if use is made of a specific kind of polyisocyanates, the use of which has not been known from the disclosures of prior publications. On the basis of this finding, the present invention has been completed.

SUMMARY OF THE INVENTION

Therefore, the present invention relates to resin compositions comprising (A) polyphenylene ethers, (B) polyarylene sulfide and (C) polyisocyanates, wherein the polyisocyanates are organic compounds having the general formula (I):

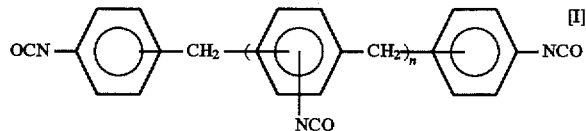

wherein n is an integer of 1 or more.

The resin composition according to the present invention is excellent in impact strength and also is economical. The resin composition can be formed into molded articles by various molding techniques such as extrusion, injection molding, blow molding, etc. Thus, the present invention brings about remarkable technical effects in the art.

DETAILED DESCRIPTION OF THE INVENTION

As examples of polyisocyanates (C) having the general formula (I), there may be mentioned bis(4-isocyanatophenylmethyl)benzene isocyanate, bis(4-isocyanatophenylmethyl)diphenylmathane diisocyanate, polymethylene polyphenylene polyisocyanates, etc. The polyisocyanates, employed in the present invention, also include polyisocyanates modified with carbodimides, and modified block polyisocyanates having isocyanate groups masked with phenols, lactams and the like.

Among these compounds, preferred polyisocyanates are polymethylene polyphenylene polyisocyanates. In the present invention, the term "polymethylene polyphenylene polyisocyanates" means mixtures of 4,4'-diphenylmethane diisocyanate with two or more polyisocyanate compounds of the general formula (I) which are different in the value n from one another. Such mixtures are commercially available. Preferred are polymethylene polyphenylene polyisocyanates having a number average molecular weight of from 260 to about 800.

The polyphenylene ethers (A), used in the present invention, are polymers having repeating units of the general formula (II):

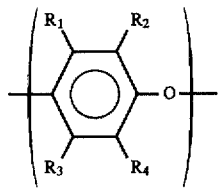

wherein $R_1$, $R_2$, $R_3$ and $R_4$ may be the same or different and individually represent a group selected from the group consisting of hydrogen and halogen atoms, hydrocarbyl groups, substituted hydrocarbyl groups, hydrocarbyloxy groups and substituted hydrocarbyloxy groups. As examples of substituents present in substituted hydrocarbyl groups and substituted hydrocarbyloxy groups, there may be mentioned a number of groups having thermal stability, such as halogen atoms, and hydroxyl, amino, nitro, cyano, carboxyl, amide, ether, sulfide and sulfone groups and the like.

Examples of the polyphenylene ethers represented by the general formula (II) include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether) poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and copolymers containing plural kinds of the repeating units mentioned above. The copolymers include, for instance, copolymers of 2,6-dimethylphenol with poly substituted phenols such as 2,3,6-trimethylphenol, 2,3,5,6-tetramethlphenol and the like. The term, used in the present invention, "polyphenylene ethers" also includes polyphenylene ethers grafted with styrene monomers such as styrene, α-methystyrene, etc. Preferred polyphenylene ethers are poly(2,6-dimethyl-1,4-phenylene ether) and a copolymer of 2,6-dimethylphenol with 2,3,6-trimethylphenol.

The preferred molecular weight of the polyphenylene ethers, used in the present invention, will vary depending on the purpose of using the same. In general, the polyphenylene ethers preferably have a molecular weight expressed as intrinsic viscosity (measured in chloroform at 30° C.) of from 0.1 to 0.7 dl/g, more preferably from 0.2 to 0.6 dl/g.

Such polyphenylene ethers can be produced in a known manner disclosed, for instance, in U.S. Pat. Nos. 3,306,874, 3,306,875 and 3,257,357,1 Japanese Patent Application KOKOKU No. 52-17880, and Japanese Patent Application KOKAI Nos. 50-51197 and 1-304119.

It is also possible to use the polyphenylene ethers (A) together with modifiers such as unsaturated carboxylic acids or unsaturated carboxylic acid anhydrides, or to modify the polyphenylene ethers (A) with such modifiers before the use thereof, as in the case of known resin compositions disclosed in Japanese Patent Application KOKAI No. 2-49023. However, it is not generally preferred to employ such modifiers, in view of economy and of corrosion prevention of molds and molding machines.

The polyarylene sulfides (B), employed in the present invention, are polymers which have repeating units of the general formula (III).

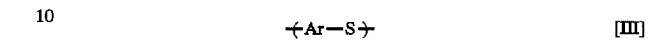

wherein Ar represents a divalent aromatic residue.

Examples of the groups Ar include groups having the following formulas

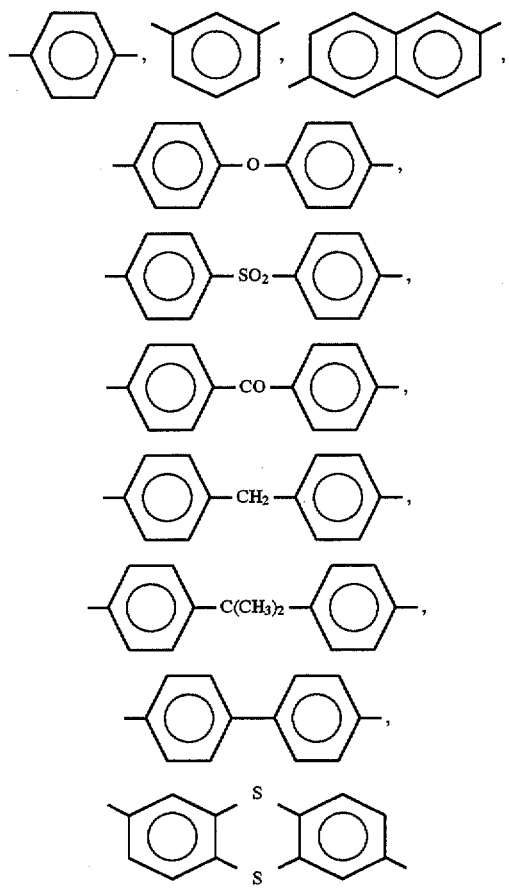

and similar groups having substituents on the aromatic rings thereof. Furthermore, the polyarylene sulfides, used according to the present invention also include the polymers which have not only the above-mentioned divalent aromatic groups but also a small quantity of trifunctional groups such as

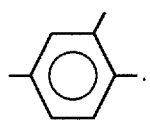

As examples of the polyarylene sulfides having the general formula (II), there may be mentioned polyphenylene sulfide, poly(1,4-phenylene-carbonyl-1,4-phenylene sulfide), poly(1,4-phenylene-sulfonyl-1,4-phenylene sulfide), poly(biphenylene sulfide) and the like. Preferred polyarylene sulfides are those having at least 50% by mole of the unit

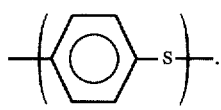

More preferably, the polyarylene sulfides are polyphenylene sulfides.

There is no specific limitation on the molecular weight of the polyarylene sulfides. In general, however, use is made of the polyarylene sulfides having a molecular weight expressed as melt viscosity (at 300° C.) of from 100 to 50,000 poises, preferably from 200 to 20,000 poises.

Such polyarylene sulfides can be produced by known methods, for instance, (i) a reaction of dihalogenated aromatic compounds with alkali metal sulfides in organic polar solvents (U.S. Pat. Nos. 2,513,188 and 4,038,261), Japanese Patent Application KOKOKU Nos. 44-27671, 45-3368 and 52-12240, and Japanese Patent Application KOKAI No. 55-43139, (ii) a condensation reaction of thiophenols in the presence of alkaline catalysts, copper salts or the like (U.S. Pat. No. 3,274,165), and (iii) a reaction of aromatic hydrocarbons with sulfur chlorides in the presence of Lewis acids (Japanese Patent Application KOKOKU No. 46-27255).

The proportion of polyphenylene ethers (A) to polyarylene sulfides (B), contained in the resin compositions according to the present invention, is not limited to a narrow range, but may be varied depending, for instance, on the thermal resistance, flowability, etc. required for the resin compositions, and also on the purpose of using the compositions. Generally, the weight ratio of polyphenylene ethers (A) to polyarylene sulfides (B) is between 1:99 and 99:1, preferably between 5:95 and 95:5, when expressed by weight per cent based on the total weight of polyphenylene ethers (A) and polyarylene sulfides (B).

As for polyisocyanates (C), used in the resin compositions according to the present invention, it is observed that the effects of polyisocyanates (C) will vary depending on the kinds of polyisocyanates (C) themselves, and also on the kinds and chemical constitutions of polyphenylene ethers (A) and polyarylene sulfides selectively used together with polyisocyanates (C) in question, and therefore it is rather difficult to simply prescribe a preferred range of the amount of polyisocyanates (C) used. Generally, polyisocyanates (C) are employed in an amount of from 0.01 to 30 parts by weight, preferably from 0.1 to 20 parts by weight, more preferably from 0.6 to 10 parts by weight per 100 parts by weight of the sum of polyphenylene ethers (A) and polyarylene sulfides (B).

The resin compositions according to the present invention may be prepared in any of known manners, including solution blending techniques, melt blending techniques, etc. Preferred are melt blending techniques. In a melt blending method, use may be made of known mixing means such as Henschel mixer, Super mixer, ribbon blender, V-blender and the like, for mixing resin components with each other or for mixing resin components with liquid or solid additives to obtain a homogeneous mixture. After the mixing operation, the mixture thus formed may be blended with other materials or with other mixtures in blending means such as Banbury mixer, plastomills, Brabender Plastograph, single or twin screw extruder and the like.

The blending operations may be carried out at a temperature of from 150° to 400° C., preferably from 200° to 350° C.

As catalysts for promoting the reaction of polyisocyanates (C), it is possible to use tertiary amines, quaternary ammonium salts, phosphines, imidazoles and the like without any limitations.

If desired, the resin compositions according to the present invention may optionally contain other substances. Examples of such other substances are other resins, elastomers, flame retardants, stabilizers, plasticizers, lubricants, pigments, reinforcing fibers, fillers, etc.

The other resins, which may be incorporated into the resin compositions according to the present invention, include, for instance, polyamides such as nylon-6, nylon-66, nylon-12, etc.; polyamide-imides; polyacrylic esters such as polymethyl methacrylates and the like; polyvinyl halides such as polyvinyl chlorides, polyvinylidene chlorides and the like; polystyrene type polymers such as polystyrene, ABS, etc.; polyolefins such as polyethylenes, polypropylenes and the like; polyesters such as PET, PBT, polyarylates and the like; polycarbonates; polysulfones; polyketones, etc.

As examples of elastomers, there may be mentioned natural rubbers, polybutadiene rubbers, polyisoprene rubbers, butyl rubbers, ethylene-propylene copolymer rubbers, butadiene-styrene copolymer rubbers, butadiene-acrylonitrile copolymer rubbers, hydrogenated and unhydrogenated styrene-conjugated diene block copolymer rubbers, polyester rubbers, acryl rubbers, silicone rubbers, modified products thereof, etc.

Among these rubbers, preferred elastomers are ternary polymers prepared from diene compounds; ethylene-propylene copolymer rubbers including graft copolymers and modified derivatives thereof prepared by the graft copolymerization, wherein unsaturated monomers, e.g. styrene are used for the grafting; and styrene-conjugated diene block copolymers such as styrene-isoprene diblock copolymers, styrene-butadiene triblock copolymers, and at least partially hydrogenated derivatives thereof.

As flame retardants, it is possible to use phosphate esters including triphenyl phosphate, tricresyl phosphate, certain phosphates prepared by using a mixture of phenol and isopropyl phenol, phosphates obtained by employing a mixture of difunctional phenols such as benzohydroquinone or bisphenol A with other phenols or alcohols, and the like; bromine compounds such as decabromo-biphenyl, pentabromo-toluene, decabromo-diphenyl ether, hexabromobenzene, brominated polystyrenes, brominated epoxy resins, etc.; nitrogen-containing compounds such as melamine, and melamine triisocyanurate, and the like; and inorganic substances such as red phosphorus, antimony trioxide, boron oxide, etc.

Examples of reinforcing fibers are inorganic fibers such as glass fibers, potassium titanate fibers, rock wools, carbon fibers and the like; organic fibers such as aromatic polyamide fibers, polybenzimidazole fibers, etc.; and metal fibers such as brass fibers, aluminium-zinc fibers, etc.

As examples of fibers, there may be mentioned glass beads, milled glass fibers, asbestos, wollastonite, mica, talc, clays, calcium carbonate, magnesium hydroxide, silica, diatomaceous earth and the like; metallic fillers such as aluminium flakes, zinc flakes, etc.; and organic fillers such as powdery polyimides and the like.

Examples of stabilizers include sterically hindered phenols, organic phosphites, oxalic acid diazides, sterically hindered amines, etc. As pigments, it is possible to use, for instance, carbon black, iron oxide, titanium oxide, zinc sulfide, etc. Examples of lubricants are polyethylene waxes, paraffins and the like.

These optional substances may be used in an amount depending on the purpose of using the same. In general, these substances are used, for instance, in an amount shown below. The amount of each of other fibers and elastomers is 100 parts by weight or less, the amount of flame retardants is 30 parts by weight or less, preferably from 1 to 20 parts by weight, the amount of stabilizers is 20 parts by weight or less, preferably from 0.001 to 10 parts by weight, the amount of each of reinforcing fibers and fillers is 150 parts by weight or less, preferably from 0.1 to 100 parts by weight, and the amount of lubricants is 2 parts by weight or less per 100 parts by weight of the sum of polyphenylene ethers (A) and polyarylene sulfides (B).

The present invention will be illustrated in more detail by the Examples given below. However, it should be noted that the scope of the present invention is not limited only to the Examples.

In the Examples, the izod impact strength (thickness: 3.2 mm; unnotched), was determined at 23° C. according to ASTM D256, wherein test pieces prepared by an injection molding were used.

EXAMPLE 1

40 parts by weight of poly(2,6-dimethyl-1,4-phenylene ether) ("PPE H-46", manufactured by Japan Polyether Co., Ltd.), 60 parts by weight of linear polyphenylene sulfide ("Ryton E1880", manufactured by Toray Philips Co., Ltd.) and 3 parts by weight of 2,4-bis(4-isocyanatophenylmethyl)benzene isocyanate were subjected to an extrusion operation in a single screw extruder having a diameter of 40 mm at a barrel temperature of 300° C. The extruded strands were pelletized, whereby a resin composition according to the present invention was obtained. The resin composition had an Izod impact strength as high as 264 kg·cm/cm.

EXAMPLE 2

The procedures of Example 1 were repeated, except that 2,4-bis(4-isocyanatophenylmethyl)benzene isocyanate was replaced by a polymethylene polyphenylene polyisocyanate ("Sumidur 44V20", manufactured by Sumitomo Bayer Urethane Co., Ltd.). Thus, a resin composition according to the present invention was obtained.

The resin composition had an Izod impact strength as high as 321 kg·cm/cm.

COMPARATIVE EXAMPLE 1

The procedures of Example 1 were repeated, except that 2,4-bis(4-isocyanatophenylmethyl)benzene isocyanate was replaced by 4,4'-diphenylmethane diisocyanate. Thus, a resin composition was obtained.

The resin composition had an Izod impact strength of 216 kg·cm/cm.

What is claimed is:

1. A resin composition comprising (A) polyphenylene ether, (B) polyarylene sulfide and (C) polyisocyanate, wherein the polyisocyanate is an organic compounds having the general formula:

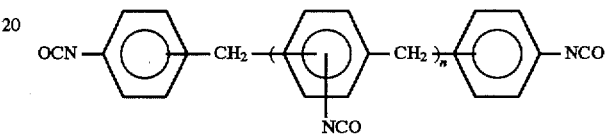

wherein n is an integer of 1 or more.

2. A resin composition according to claim 1, wherein the polyisocyanate is bis(4-isocyanatophenylmethyl)benzene isocyanate.

3. A resin composition according to claim 1, wherein the polyisocyanate is polymethylene polyphenylene polyisocyanate.

4. A resin composition according to claim 1, wherein the resin composition comprises 100 parts by weight of a composition of 1–99% by weight of polyphenylene ether (A) and 99–1% by weight of polyarylene sulfide (B), and 0.01–30 parts by weight of polyisocyanate (C).

* * * * *